Figure 1:
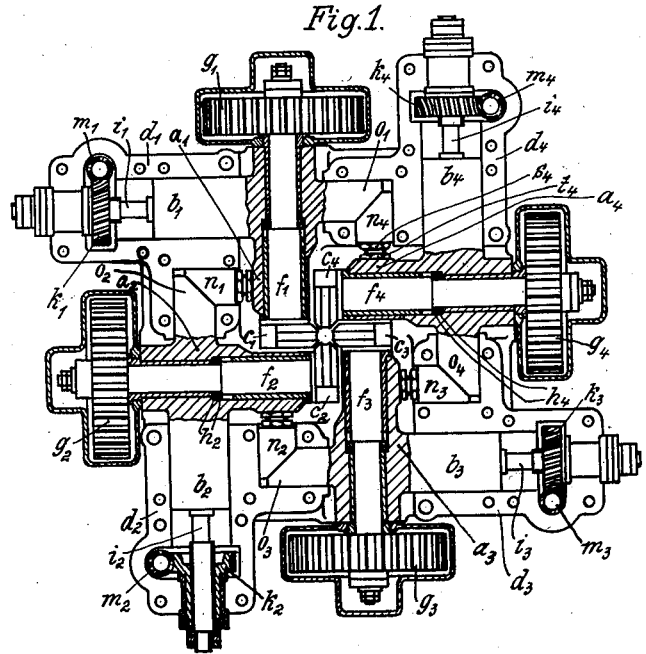

Jan. 13, 1931. H. STUTING 1,788,693
ROLL BEARINGS IN UNIVERSAL ROLLING MILLS
Filed May 17, 1928

H. Stuting
INVENTOR

By: Marks & Clerk
ATTYS.

Patented Jan. 13, 1931

1,788,693

UNITED STATES PATENT OFFICE

HEINRICH STÜTING, OF WITTEN-ON-THE-RUHR, GERMANY

ROLL BEARINGS IN UNIVERSAL ROLLING MILLS

Application filed May 17, 1928, Serial No. 278,599, and in Germany December 10, 1926.

To arrange for adjustability of the pass in universal rolling mills is a difficult matter. Efforts have been made to achieve this result by making the roll axle bearings eccentric, but with such known arrangements the adjustability of the passes is very limited, and in many cases it is desirable to obtain a more extended adjustability of the passes.

According to this invention in order to obtain an extended adjustability of the passes between segmental rolls which may be rotated or oscillated, the bearings in which the axles of the rolls are mounted are not cast integrally with the bearing stand but are separate therefrom and are provided with journal stems extending at right angles to the roll axis. The journal block for a single roll is therefore T-shaped. The stem of this block is adjustable in a bearing on the bearing stand. This adjustment can be effected within extended limits and in any manner required by means of a screw spindle, a worm and worm-wheel, or by means of a hydraulically operated or other convenient device, and each journal block may be adjusted separately or all adjusted simultaneously.

If the roll axles are coupled direct to a gear, the stem of the journal block may be arranged very near to the rolls. But if driven, for instance by means of toothed gearing the adjustable stem of the journal block is bound to be removed so far from the rolls as to freely pass the gearing with its bearing. Only in this way is it possible to obtain a sufficiently long bearing for the stem and arranging for the device for adjusting the bearings. The overhang from the pass of the rolls up to the movably supported journal may thus become very considerable.

If the rolls have to perform light work only such as reducing hollow material without the use of a mandrel, such overhang may still be permissible; but in rolling solid or hollow material over a mandrel, no doubt the deflection would be excessive and the passes could not be kept within the required measurements.

Arrangements have become known in which props to prevent deflection have been provided to bear directly on the rolls. In such cases ball-shaped head rolls are provided with cavities engaging into each other and thereby supporting each other. Apart from these rotary supports being liable to become clogged by scale or the like and being also liable to great wear, they theoretically touch each other on a line contact only and cannot be subjected to great stresses. Besides such arrangements can only be used for passes which are not adjustable since it is not possible for the journal blocks to draw more closely together. On the other hand in drawing apart from each other, i. e. to widen the pass, the supporting surfaces will become separate from each other and therefore ineffective.

According to the present invention these drawbacks are to be avoided in the following manner:—

In order to prevent a deflection of the roll axle bearings, when operating in any position they may occupy within the limits of adjustability of the journal blocks, and under greatest stresses which may occur, the stem at the opposite side of the roll bearings is lengthened and the end-faces of the prolongations formed at an angle of 45°. The rolls thus support each other by the 45° angular surfaced end-face of the prolongations, while the other straight side of the stem bears against the housing. The journal blocks and rolls thus form a closed chain in every position within the limits of adjustability of the system. Deflection or bending of the bearings is thus avoided.

The stems can be arranged close to the working faces of the passes.

During rolling, roll guides for the material to be rolled are very useful which can be formed also as roll catch bushes. In such cases these bushes may comprise several parts each of which is joined to a journal block. In opening and closing the passes these bushes exactly follow the movement of the passes.

The invention is clearly illustrated in the accompanying drawings, in which:—

Figure 2:
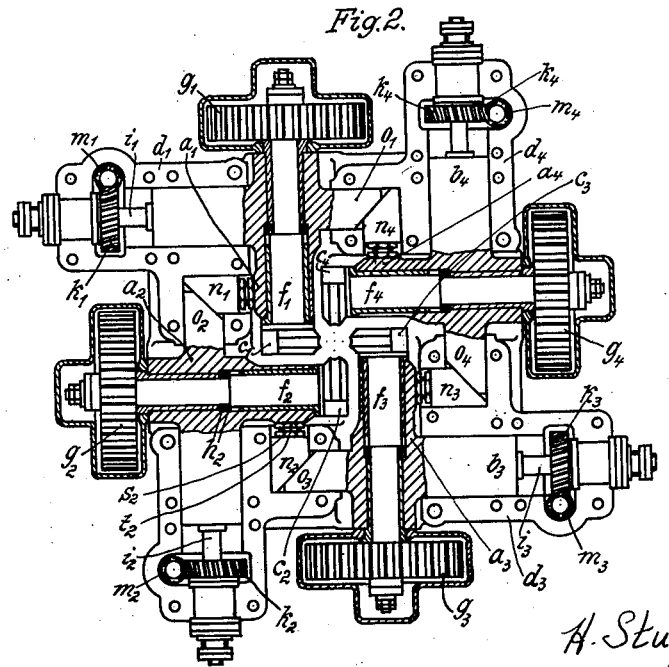

Fig. 1 is a view partly in section showing the position of the gear parts and the housing frame with the pass closed, and Fig. 2 is a similar view showing the pass opened.

Similar characters of reference are employed throughout the above described views to indicate corresponding parts.

Referring now more particularly to the drawing there are provided four rolls $c_1$, $c_2$, $c_3$, $c_4$ respectively arranged in overhanging formations at the ends of the roll axles $f_1$, $f_2$, $f_3$ and $f_4$, which latter in turn are mounted in long bearing bushes $a_1$, $a_2$, $a_3$, $a_4$ and carry at their ends the driving wheels $g_1$, $g_2$, $g_3$ and $g_4$ respectively. Adjusting rings $h_1$, $h_2$, $h_3$, $h_4$ provided in the middle are adapted to prevent the axial displacement of the roll axles. Four housing accessories or stems $b_1$, $b_2$, $b_3$, $b_4$ respectively engage around the said long bearing bushes and have a cross-shaped form and are adapted to move transversely to the roll axles. The displacement is effected by means of four adjusting spindles $i_1$, $i_2$, $i_3$ and $i_4$ which are driven respectively by worm wheels $k_1$, $k_2$, $k_3$ and $k_4$ and worms $m_1$, $m_2$, $m_3$ and $m_4$ and by connecting the four worms by a common drive, which is not shown, the coincidence of the movements of all four adjusting spindles is established.

In order to relieve the bearings or guides $d_1$, $d_2$, $d_3$ and $d_4$ of the housing accessories $b_1$, $b_2$, $b_3$, $b_4$ from the rolling pressure and to transmit the latter to the housing and to the adjusting spindles $i_1$, $i_2$, $i_3$, and $i_4$ the housing accessories $b_1$, $b_2$, $b_3$ and $b_4$ are respectively supported near the rolls by pressure members $n_1$, $n_2$, $n_3$ and $n_4$ which may be adjusted to an accurate length by means of pressure screws $s_1$, $s_2$, $s_3$ and $s_4$ respectively. After adjustment, the pressure screws are secured by nuts.

The said pressure members $n_1$, $n_2$, $n_3$, and $n_4$ are bevelled at their ends under an angle of 45° and bear respectively with these faces on extensions $o_2$, $o_3$, $o_4$ and $o_1$ of the housing accessories $b_2$, $b_3$, $b_4$ and $b_1$ which are bevelled under the same angle. As shown the four housing accessories are successively designated $b_1$, $b_2$, $b_3$, $b_4$, so that the pressure member $n$ of the housing accessory $b_1$ bears on the extension $o_2$ of the housing accessory $b_2$; the pressure member of $b_2$ on the extension of $b_3$ and so on until the pressure member of $b_4$ again bears on the extension of $b_1$. Owing to the relatively supported faces being inclined under an angle of 45°, the axial displacement of one pressure member to a certain extent has the result that the corresponding extension member is capable of movement to the same extent on its own axis disposed at an angle of 90°. If all four adjusting spindles $i_1$, $i_2$, $i_3$ and $i_4$ are operated at the same time as is the case by the previously mentioned single drive, all four pressure members, $n_1$, $n_2$, $n_3$ and $n_4$ will move a certain distance at the same time, for instance, during the opening of the pass, while at the same time the extension of the housing accessories $b_2$, $b_3$, $b_4$ and $b_1$ will release the pressure members $n_2$, $n_3$, $n_4$ and $n_1$. However, during the closing of the pass, the extensions $o_1$, $o_2$, $o_3$ and $o_4$ respectively press against the pressure members $n_4$, $n_3$, $n_2$ and $n_1$ which find for their own movement exactly the same free path to the extent of which the extensions advance during the closing of the pass. The result is that in each position of the rolls $c_1$, $c_2$, $c_3$ and $c_4$ a contact between the pressure members $n_1$, $n_2$, $n_3$ and $n_4$ and the extensions $o_2$, $o_3$, $o_4$ and $o_1$ of the housing accessories $b_2$, $b_3$, $b_4$ and $b_1$ respectively takes place whereby the desired transmission of the rolling pressure is effected.

It may also be stated that the shifting of the pass for the driving wheel is not disadvantageous. The position of the four wheels, which engage with the wheels shown in the drawing, is such that the normal center of the wheels exists with closed pass (operative position). Since the wheels have evolvent teeth, variations of the center within certain limits are of no importance, in the case of open pass (idle position) only very slight forces arising from the friction in the bearings are transmitted by the toothed wheels so that in this position it would be sufficient for the wheels to remain in engagement with the face of the teeth. Since the direction of movement during the adjustment is approximately vertical to the center, only a very unimportant increase of the latter will take place in the idle position.

Having thus fully described the invention what is claimed as new and desired to be secured by Letters Patent is:—

1. A device of the character described including a plurality of roll bearings arranged in substantially cross-like formation in the same plane with the axes slightly offset, an adjusting stem projecting from each of said bearings, rolls journalled in said bearings, rigid bearings for said stems, a pressure member projecting from each bearing opposite the stem, and an extension projecting from each bearing parallel to the stem and coacting with the outer end of the adjacent pressure member, substantially and for the purposes set forth.

2. An arrangement as claimed in claim 1, wherein each roll includes a body and an elongated axle, the body being arranged in overhanging formation at one end of the axle.

In testimony whereof I have signed my name to this specification.

HEINRICH STÜTING.